United States Patent
Schubert et al.

(10) Patent No.: US 6,321,998 B1
(45) Date of Patent: Nov. 27, 2001

(54) METHOD OF PRODUCING DISPERSIONS AND CARRYING OUT OF CHEMICAL REACTIONS IN THE DISPERSE PHASE

(75) Inventors: Klaus Schubert, Karlsruhe; Wilhelm Bier, Eggenstein-Leopoldshafen; Gerd Linder, Karlsruhe; Erhard Herrmann, Leverkusen; Bernd Koglin, Bergisch Gladbach; Thomas Menzel, Hilden, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/068,264

(22) PCT Filed: Oct. 24, 1996

(86) PCT No.: PCT/EP96/04664

§ 371 Date: May 5, 1998

§ 102(e) Date: May 5, 1998

(87) PCT Pub. No.: WO97/17133

PCT Pub. Date: May 15, 1997

(30) Foreign Application Priority Data

Nov. 6, 1995 (DE) .............................. 195 41 265

(51) Int. Cl.[7] ..................................... A62C 5/02
(52) U.S. Cl. ........................... 239/8; 239/430; 239/433; 366/340
(58) Field of Search ................... 239/1, 8, 429, 239/430, 433

(56) References Cited

U.S. PATENT DOCUMENTS

| | | | |
|---|---|---|---|
| 3,871,624 | * 3/1975 | Huber et al. | 366/336 |
| 5,094,788 | * 3/1992 | Schrenk et al. | 366/340 |
| 5,152,060 | 10/1992 | Schubert et al. | 29/890 |
| 5,249,359 | 10/1993 | Schubert et al. | 29/890 |
| 5,803,600 | * 9/1998 | Schubert et al. | 366/340 |
| 6,082,891 | * 7/2000 | Schubert et al. | 366/340 |

FOREIGN PATENT DOCUMENTS

| | | | |
|---|---|---|---|
| 2073604 | 10/1981 | (GB) | B01F/5/00 |
| 9530476 | 11/1995 | (WO) | B01F/5/04 |

OTHER PUBLICATIONS

Grundlagen der chemischen Technik: Reaktionstechnik in Blasensäulen.

Klinsiek, B., Koglin, Bl, "Verfahren zur Herstellung von Salben und Emulsionen", GVC/VDI proceedings, annual conference 1991, Cologne, pp. 1–19.

Blasse, E., "Bildung und Koaleszenz von Blasen und Tropfen", Dechema monographs, vol. 114, VCH Verlagsgesellschaft, pp. 371–409.

Gerstenberg, H., "Blasensäulen–Reaktoren", Chem.–Ing.–Tech. 51 (1979) pp. 208–216.

* cited by examiner

Primary Examiner—Andres Kashnikow
Assistant Examiner—Dinh Q. Nguyen
(74) Attorney, Agent, or Firm—Norris McLaughlin & Marcus (57) ABSTRACT

In the process for the continuous dispersion of at least one fluid A constituting the disperse phase and at least one continuous phase constituting the enclosing phase of a fluid B, at least one fluid stream A and at least one fluid stream B are fed into a dispersion apparatus and come into contact therein in a dispersion chamber. To this end, a microstructure dispersion apparatus (1a, 1b, 3a, 3b) is used in which the fluid streams A, B are broken up into spatially separate, flowing fluid filaments by a system of microchannels (1a, 1b) associated therewith, which filaments are discharged into the dispersion chamber (4) at identical flow velocities for the particular fluid in such a manner that on discharge into the dispersion chamber (4) a fluid jet (6a) of the disperse phase is in each case immediately adjacent to a fluid jet (6b) of the continuous phase and in each case a fluid jet (6a) of the disperse phase is enclosed as it is broken up into particles in the adjacent fluid jets (6b) of the continuous phase.

10 Claims, 6 Drawing Sheets

METHOD OF PRODUCING DISPERSIONS AND CARRYING OUT OF CHEMICAL REACTIONS IN THE DISPERSE PHASE

Dispersion is the term used to describe the break-up and finest possible distribution of one substance in another. The finished mixture is known as a dispersion. A dispersion comprises one or dispersed phases in a continuous phase. Thus, in contrast to mixing, the aim is not to achieve mutual interpenetration of the individual phases, but instead to achieve the most uniform possible break-up and distribution of one or more disperse phases in a continuous phase. Typical examples from the chemicals sector of dispersions produced by dispersion are liquid/liquid systems such as emulsions (disperse phase: liquid, continuous phase: liquid), gas/liquid systems such as gas-bubbled liquids and melts (disperse phase: gas, continuous phase: liquid/melt), such as for example during foaming of plastic melts, and mist (disperse phase: liquid, continuous phase: gas) together with liquid/solid systems such as suspensions (disperse phase: solid, continuous phase: liquid), in which the solid phase arises during the dispersion process by precipitation of a dissolved substance as an insoluble precipitate. Dispersion is either a purely physical process of break-up as in the case of producing emulsions for ointments or creams or, as in many industrial applications, is used as the first initiating reaction stage in the performance of chemical reactions in two- or multiphase reaction systems. During the performance of chemical reactions, the nature of the dispersion is substantially determined by kinetics, i.e. by the rate of the underlying reaction. Thus, in the case of rapid chemical reactions, mass transfer between the phases participating in the reaction is decisive to the rate of the chemical reaction. One substantial task of the dispersion stage is accordingly, in order to accelerate mass transfer, to produce the largest possible interfacial area per unit reaction volume, i.e. small disperse particles, such as liquid droplets or gas bubbles, and to minimise the energy input required for this purpose.

The aim of industrial dispersion processes is thus to break up and distribute one or more components uniformly and reproducibly in a continuous phase. The objectives here are, inter alia, the production of dispersions having defined particle sizes for the disperse phase, the smallest possible particles with a correspondingly large interfacial area per unit volume between the disperse and continuous phases together with narrow particle size distributions. The dispersion apparatus used for dispersion should be designed and constructed such that it accomplishes the dispersion task with minimal energy input, i.e. highly efficiently.

Numerous dispersion units are used for dispersion in the prior art. A distinction must be drawn in principle between dynamic and static dispersion apparatus [1], [2], [3]. A dynamic dispersion apparatus is characterised in that both the disperse phase as it forms and the continuous phase pass through or over it and that it is set in motion by input of energy, wherein the kinetic energy of the continuous phase exerts an additional break-up action on the disperse phase. In contrast, in a static dispersion apparatus only the disperse phase as it forms passes through or over the apparatus.

Examples of dynamic dispersion apparatus for liquid/liquid systems are nozzles, nozzles combined with downstream jet dispersers, stirrers and rotor/stator systems [2], those for gas/liquid systems are injectors, ejectors (=jet suction pumps), venturi nozzles and stirrers [1], [3] and those for liquid/solid systems are precipitator nozzles and stirrers.

Examples of static dispersion apparatus for liquid/liquid, gas/liquid and solid/liquid systems are submerged tubes, sieve-plates, perforated plates made from metal, rubber or plastic, optionally also with a pulsating plate, manifold rings and sintered glass or metal plates (preferably for gas/liquid systems [1], [3]).

A disadvantage of using available prior art dynamic dispersion apparatuses is that the disperse phase is broken up in a turbulent shear field, wherein the non-uniform distribution of local energy dissipation rates results in broad particle size distributions for the disperse phase. Moreover, in comparison with static dispersion apparatuses, a high energy input is required to produce dispersions having small average particle dimensions for the disperse phase and a correspondingly large interfacial area per unit volume.

Conventional static dispersion apparatuses are indeed more efficient than dynamically operated apparatuses, i.e. the ratio of the resultant interfacial area per unit volume to the energy input is greater. However, the interfacial area per unit volume and thus reactor output or space-time yield actually achievable with static apparatuses is generally small. Using static apparatuses, particle dimensions for the disperse phase are obtained which are larger than the dimensions of the bores through which the disperse phase is introduced, i.e. usually larger than 1 mm. While sintered plates do indeed allow particles smaller than 1 mm to be produced, they have a tendency to soiling and encrustation and their use is restricted to relatively small throughputs and thus relatively small reactor outputs.

Starting from this prior art, the object underlying the present invention is as follows. The aim is to produce high quality dispersions tailored to the particular application. It is necessary to this end for the disperse phase to consist of particles, the dimensions of which are freely adjustable within broad limits and the size of which is preferably in the range of finely divided particles of smaller than 1 mm. This results in a correspondingly large interfacial area per unit volume. It is furthermore advantageous to be able to establish narrow particle size distributions. The energy input for the production of such dispersions must be lower than when a prior art dispersion apparatus is used. The dispersion apparatus used must furthermore allow relatively large throughputs so rendering industrial implementation feasible.

This object is achieved by a process for the continuous dispersion of at least one fluid A constituting the disperse phase and at least one continuous phase constituting the enclosing phase of a fluid B, in which at least one fluid stream A and at least one fluid stream B are fed into a dispersion apparatus and come into contact therein in a dispersion chamber. The characterising feature of the subject-matter of the invention is that the fluid streams A, B are broken up into spatially separate, flowing fluid filaments in a microstructure dispersion apparatus by a system of microchannels associated therewith, which filaments are discharged into the dispersion chamber at identical flow velocities for the particular fluid in such a manner that on discharge into the dispersion chamber a fluid jet of the disperse phase is in each case immediately adjacent to a fluid jet of the continuous phase and in each case a fluid jet of the disperse phase is enclosed as it is broken up into particles in the adjacent fluid jets of the continuous phase. The fluid filaments may be cylindrical, lamellar or of any other geometric shape.

The process may be performed in such a manner either that a gas is used as fluid A and a liquid as fluid B or that at least two different liquids are used as the fluids. In the first case, the process is thus used for gas bubbling and in the second for production of an emulsion.

One specific embodiment which is of interest is that educts A, B which react together chemically are used as the fluid, such that immediately after dispersion a chemical reaction of the educts A, B proceeds in the dispersion chamber.

Laminar flow conditions for the fluid streams A and B are preferably maintained in the microchannels. Laminar flow conditions thus also prevail for fluid streams A and B immediately after discharge from the microchannels. Dispersion of the disperse phase A into the continuous phase B, which begins on discharge from the microchannels, thus proceeds under laminar conditions. Typical dispersion phenomena which occur under laminar flow conditions are, for example, so-called laminar atomisation [4] in liquid/liquid systems and, for example, so-called gas bubbling [4] in gas/liquid systems. There is, however, nothing to prevent operation with turbulent flow in the microchannels.

One embodiment which has proved particularly successful is that in which the fluid filaments of streams A and B are discharged into the dispersion chamber in alternately superposed or adjacent layers.

The fluid filaments of streams A and B may also be discharged into the dispersion chamber in a chess board arrangement by means of an appropriate arrangement of the microchannels.

The geometry of the microchannel dispersion apparatus is advantageously designed such that the hydraulic diameter d of the microchannels, defined as four times the cross-sectional area divided by the circumference of the microchannels, assumes values of between 10 $\mu$m and 1000 $\mu$m, preferably of between 50 $\mu$m and 250 $\mu$m. The cross-sectional ratio of the fluid jets of the continuous phase B and the disperse phase A is advantageously adjusted to values of between 1 and 100, preferably of between 2 and 50.

At microchannel dimensions of greater than 250 $\mu$m, supporting webs may be provided in the microchannels in order to increase the mechanical stability of the dispersion apparatus. Identical geometric sizing (identical cross-section and identical length) of the microchannels associated with fluid streams A and B ensures that the fluid filaments formed from fluid stream A and B are each discharged at an identical flow velocity from the microchannels. The flow velocities in the microchannels associated with fluid stream A are accordingly identical. The same applies to fluid stream B. The flow velocity of A in the microchannels may thus differ from that of B. Since the dimensions of the particles present as the disperse phase are dependent upon the flow velocity on discharge from the microchannels, uniform discharge velocities result in a narrow particle size distribution, which is frequently desired in industrial applications.

A further development of the process according to the invention consists in additionally introducing a free jet of a temperature-controlled fluid, for example for heating or cooling purposes, into the dispersion/reaction chamber in the vicinity of a free jet of A and/or B.

The basis of the process according to the invention is thus that fluid stream A for the disperse phase and fluid phase B for the continuous phase are initially divided into fine fluid filaments by means of the microstructure dispersion apparatus by partition into individual microchannels, wherein, on discharge from the microchannels, fluid stream A is broken up and distributed as the disperse phase in the continuous phase (enclosing phase) constituted by fluid stream B. Fluid streams A and B come into contact only once they have been discharged from the microstructure dispersion apparatus, but not in the apparatus itself. On discharge from the microchannels into the dispersion chamber, the disperse phase is directly enclosed by the continuous phase. In this manner, it is possible to avoid coalescence of the smaller particles into larger particles.

By means of the process according to the invention, it is possible by using a microstructure dispersion apparatus having hydraulic diameters of the microchannels of between 10 $\mu$m and 1000 $\mu$m, preferably of between 50 $\mu$m and 250 $\mu$m, to produce correspondingly small particles for the disperse phase. The resultant interfacial area per unit volume between the disperse and continuous phase is correspondingly large. These operations are substantially supported by the immediate vicinity of the continuous phase fluid filaments to the disperse phase fluid filaments. It is sufficient to pass only small quantities of continuous phase through the microstructure dispersion apparatus and to introduce the remaining proportion conventionally, for example, via a simple feed pipe, i.e. without passing it through a dispersion apparatus with energy input. The energy input required to pass the continuous phase through the microstructure dispersion apparatus is generally low. The total energy input required to achieve a given interfacial area per unit volume using a microstructure dispersion apparatus is overall lower than in comparable prior art dispersion apparatus. This type of dispersion gives rise, inter alia, to increased stability of the dispersions and to an increase in the overall reaction rate in mass transfer controlled reactions in two- and multiphase systems. The dimensions of the particles are here typically <1000 $\mu$m. The desired particle dimensions may be achieved by varying the dimensions of the microchannels, i.e. the particles may be tailored to the desired application. Narrow particle size distributions are achieved in the case of the preferably desired laminar flow conditions on discharge from the microchannel. Despite laminar flow conditions and the resultant low volumetric flow rates per microchannel, elevated throughputs are achieved using a microstructure dispersion apparatus by the possibility of connecting many individual microchannels in parallel, preferably more than 3000 microchannels per $cm^2$ of discharge area. It is known from microstructure component technology that, despite a large number of microchannels connected in parallel, these components nonetheless have only small external dimensions. This facilitates the installation of such dispersion apparatus in plant and equipment. The immediate adjacency of fluid filaments of the disperse phase A and fluid filaments of the continuous phase B entirely or partially suppresses coalescence, i.e. agglomeration of smaller particles into larger particles so broadening the resultant particle size range. The fluid filaments of the continuous phase B here act as the enclosing phase for the particles formed from the disperse phase A. Particles may thus be separated from similar adjacent particles by an enclosing layer, i.e. they may arise and flow away independently of each other. By varying the fluid streams of A and B relative to each other it is also possible purposefully to influence particle size and particle size distribution. A reduction in the throughput ratio of disperse phase A to the continuous phase B thus gives rise to smaller particles and, simultaneously, a narrower particle size range.

Figure 1:
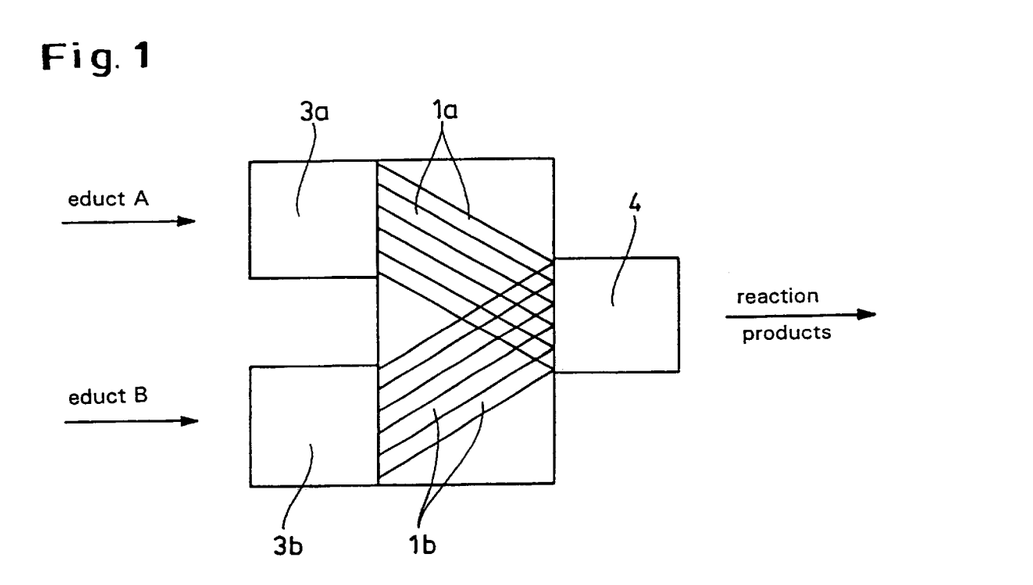
FIG. 1 shows the basic structure of a microchannel disperser for a disperse phase A (educt A) and a continuous phase (enclosing phase) B with symmetrical flow paths.

Typical areas of application of the process described above which may be mentioned are the production of dispersions, such as for example emulsions, gas-bubbled liquids, foams, mists and suspensions, together with reactions in two- or multiphase systems. A microstructure dispersion apparatus having at least one dispersion/reaction chamber and an upstream guide component to feed the fluid streams has proved suitable for performance of the process according to the invention. This apparatus may be operated both statically by passing only the disperse phase through the apparatus and dynamically by passing both the disperse and continuous phase through the apparatus. FIG. 1 shows the schematic structure of the device. The guide component is here composed of two or more plate-like members arranged one above the other in a sandwich structure, which members are traversed by microchannels which pass obliquely relative to the axis of the microdispersion apparatus, wherein the channels of adjacent members cross each other without coming into contact and open into the dispersion/reaction chamber 4. A plate with microchannels 1a is followed by a plate with microchannels 1b; i.e. two plates arranged immediately one above the other in the stack are each provided with a system of microchannels 1a, 1b, wherein the microchannel systems of successive plates form an angle α relative to each other. The plates are of a thickness of, for example, 30 μm and 1000 μm, preferably of between 50 μm and 500 μm. The hydraulic diameter of the microchannels is between 10 μm and 1000 μm, preferably between 50 μm and 250 μm. In comparison with sintered plates, the described microstructure dispersion apparatus has the advantage of a regular channel structure and thus exhibits comparatively low pressure losses on passage of the fluid, wherein the risk of plugging is simultaneously substantially lower than for a sintered plate.

The invention is illustrated below in greater detail by means of drawings and practical Examples.

FIGS. 6b and 6c show two views of a guide component made from foils according to FIG. 6a.

The systems of microchannels 1a running obliquely upwards from right to left open on the left hand side into a distribution chamber 3a, into which a fluid stream A may be fed. Similarly, the systems of microchannels 1b running obliquely downwards open on the left hand side into a distribution chamber 3b, in which a fluid stream B may be fed. Both systems of microchannels open, without crossing, into a common dispersion/reaction chamber 4. The mirror symmetrical arrangement of the microchannels 1a and 1b is not absolutely necessary. The microchannels 1b may, for example, also have a different inclination relative to the horizontal axis than the microchannels 1a. Thus, for example, the microchannels 1a for fluid stream A of the disperse phase may run parallel to the axis of symmetry, such that the fluid filaments of A exit the microchannels parallel to the tube wall of the dispersion/reaction chamber 4. In this manner, for given external dimensions of the dispersion apparatus, the length of the microchannels is minimised. In this device, the microchannels of one system are each identical with regard to flow conditions, i.e. the microchannels of one system all have the same flow resistance, such that the fluid streams A or B are uniformly divided within the system of microchannels 1a or 1b respectively.

Figure 2:
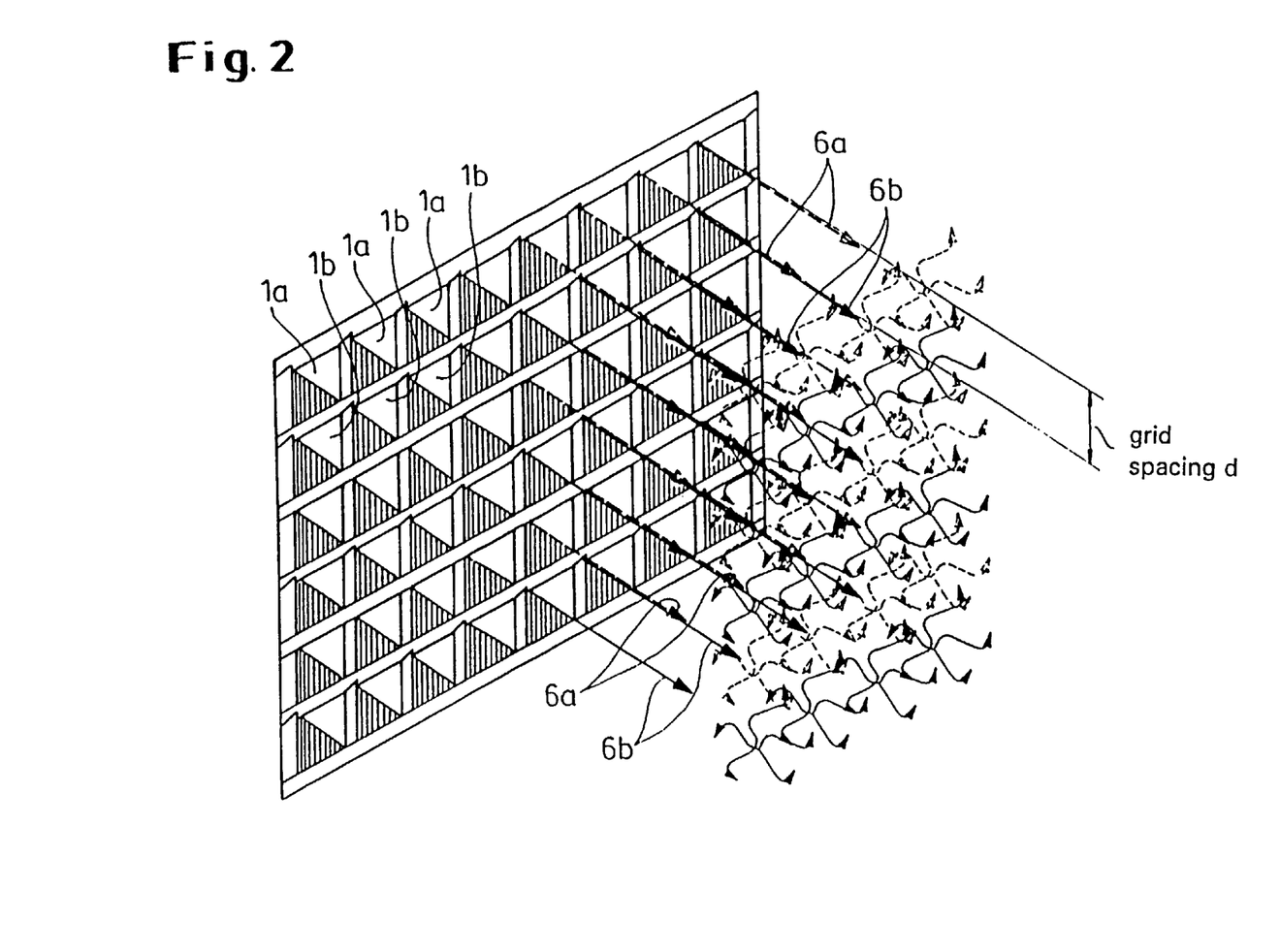
FIG. 2 is a diagrammatic representation of the microdispersion of the fluid jets associated with educts A, B as they leave the microchannel disperser and enter the dispersion chamber or reaction chamber.
Figure 3:
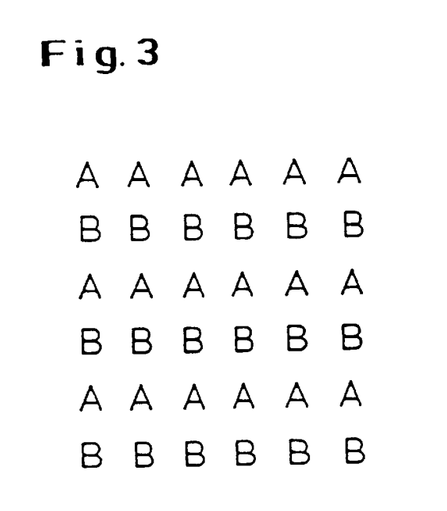
FIG. 3 shows an embodiment in which the spatial arrangement of the fluid filaments associated with educts A, B on entry into the dispersion/reaction chamber is characterised by alternating, superposed layers.
Figure 4:
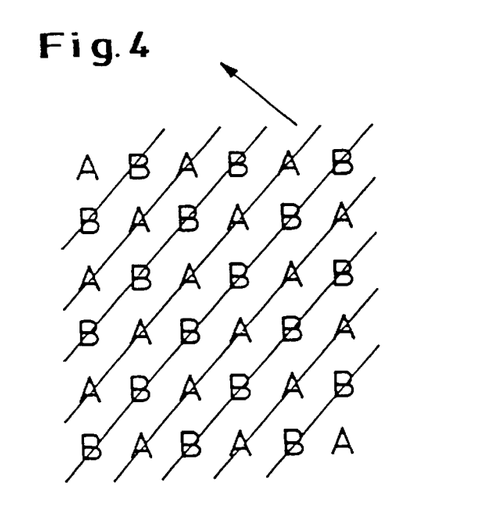
FIG. 4 shows an alternative embodiment to FIG. 3 in which the fluid filaments of educts A, B are discharged into the dispersion/reaction chamber in a chess board arrangement.
Figure 5A:
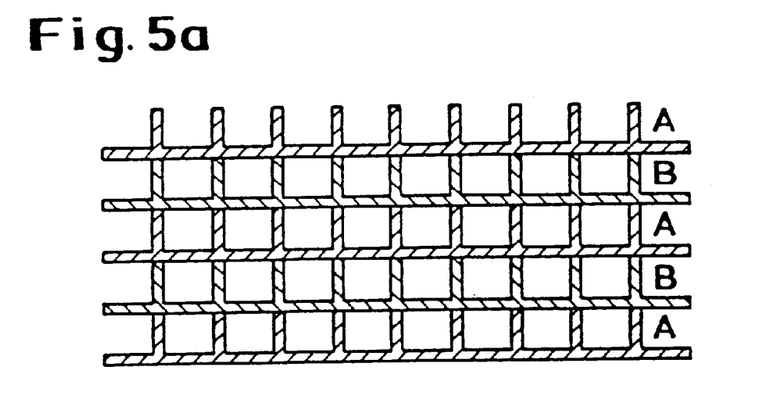
FIG. 5a shows a cross-section view of the microchannels opening into the dispersion chamber.
Figure 5B:
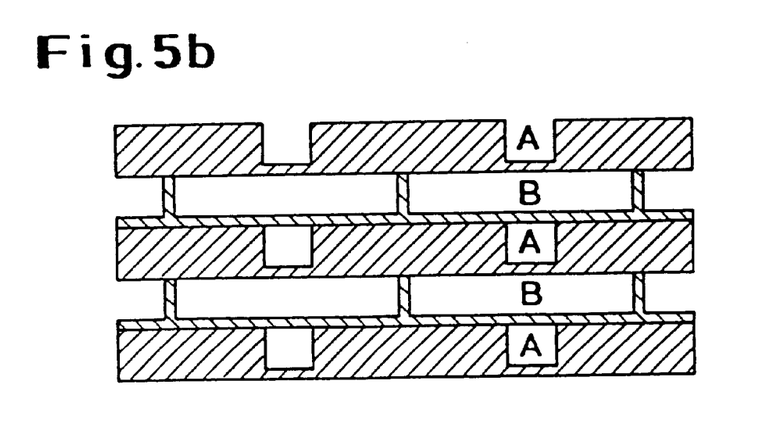
FIG. 5b shows a cross-sectional view of an alternative embodiment in which the microchannel openings are larger for the enclosing phase B than the cross-sections for the disperse phase A.

FIG. 2 shows a cross-sectional, perspective view of the opening of the microstructure dispersion apparatus. The microchannels 1a, for example associated with fluid stream A, open in the uppermost plate while the microchannels 1b for fluid stream B open in the next lower plate. There then follows another layer or plate with the microchannels belonging to fluid stream A etc.. Fluid stream A is dispersed immediately on discharge from the microchannels. FIGS. 3 and 4 show the spatial sequence in which fluid streams A and B enter the dispersion/reaction chamber 4 from the opening cross-section. A layer with fluid filaments 6a is thus in each case adjacent to a layer with fluid filaments 6b. The arrangement may, of course, also be rotated by 90°, such that the layers are next to each other. FIGS. 5a and 5b show how the space between the particles formed and thus the effectiveness with which the particles are enclosed by the continuous phase B may be varied by varying the geometry of the microchannels and the spacing of the microchannels for the disperse phase A. The microchannel dispersion apparatus according to FIG. 1 may also be modified in such a manner that three or more fluid streams are divided in each case in separate systems of microchannels and then combined in the dispersion/reaction chamber.

A practical embodiment of the microstructure dispersion apparatus which has proved particularly effective is described below with reference to FIGS. 6a to 6d.

Figure 6A:
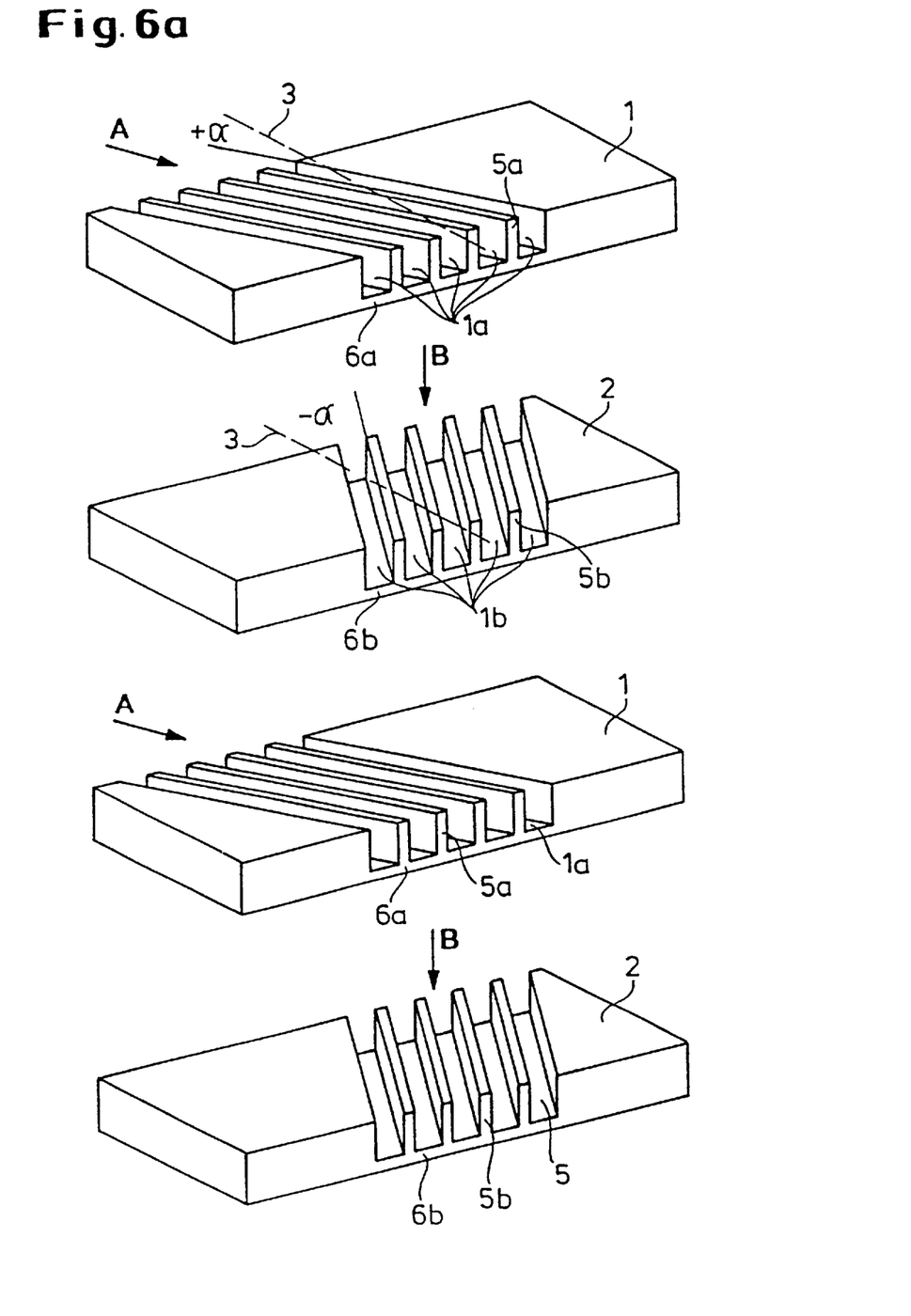
FIG. 6a shows several foils to be stacked as structural members of the microchannel disperser.

Foils 1 and 2 according to FIG. 6a have a thickness of 100 μm with a length and width of some millimetres. Foil type 1 is traversed by a system of preferably parallel, closely adjacent microchannels running obliquely relative to the longitudinal mixer axis 3, which microchannels, running from the rear left hand side, form an acute angle +α with this axis 3 and open in the central portion of the front longitudinal side of the foil. Foil type 2 is traversed in the same manner by microchannels 1b; however, in this case, the angle between the longitudinal axis of the microchannel and that of the dispersion apparatus is −α; i.e. microchannels 1b run from the rear right hand side to the central portion of the front longitudinal side of the foil. The numerical value of the angle need not, however, be identical. Microchannels 1a, 1b may be machined with shaped diamonds and preferably have a hydraulic diameter of between 10 μm and 250 μm with the intermediate webs 5a, 5b having a thickness of 30 μm; the thickness of the microchannel floors 6a, 6b is 30 μm.

The tools and devices necessary for the production of microchannels of the most varied cross-sections are presented and described in, for example, DE 37 09 278 C2. The arrows A and B represent the directions of flow of fluids A and B to be dispersed.

Figure 6B:
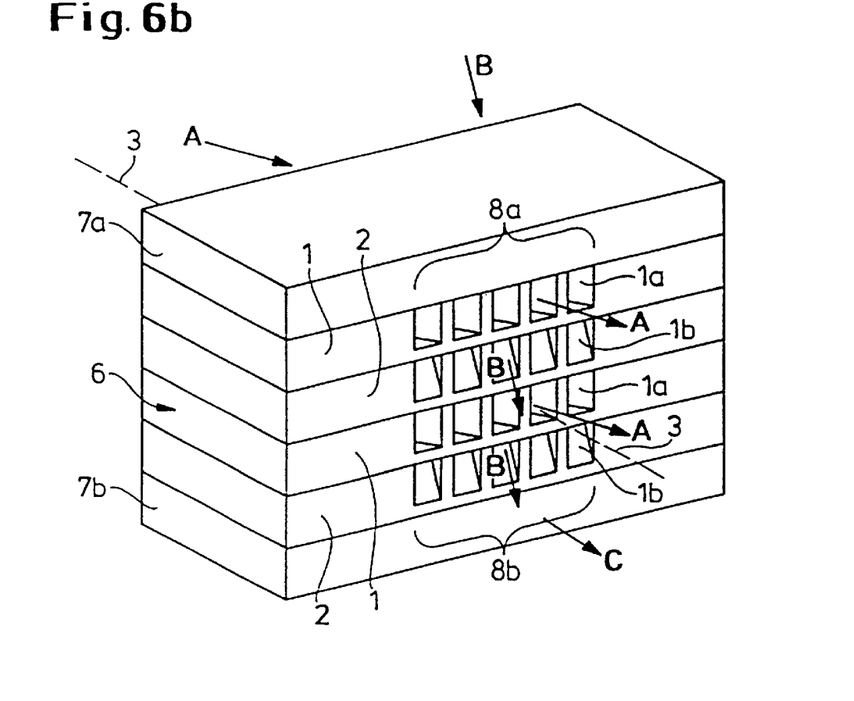

FIG. 6b shows how, in order to produce a guide component 6, foil types 1 and 2 are arranged in alternating superposed layers, are provided with an upper and lower cover plate 7a, 7b and joined together, for example, by diffusion welding into a homogeneous, vacuum-tight and pressure-resistant microstructure article. As may be seen in FIG. 6b, the arrays 8a, 8b, formed by foils 1 and 2, of openings of the channels 1a and 1b adjacent to the dispersion/reaction chamber are aligned one above the other.

Figure 6C:
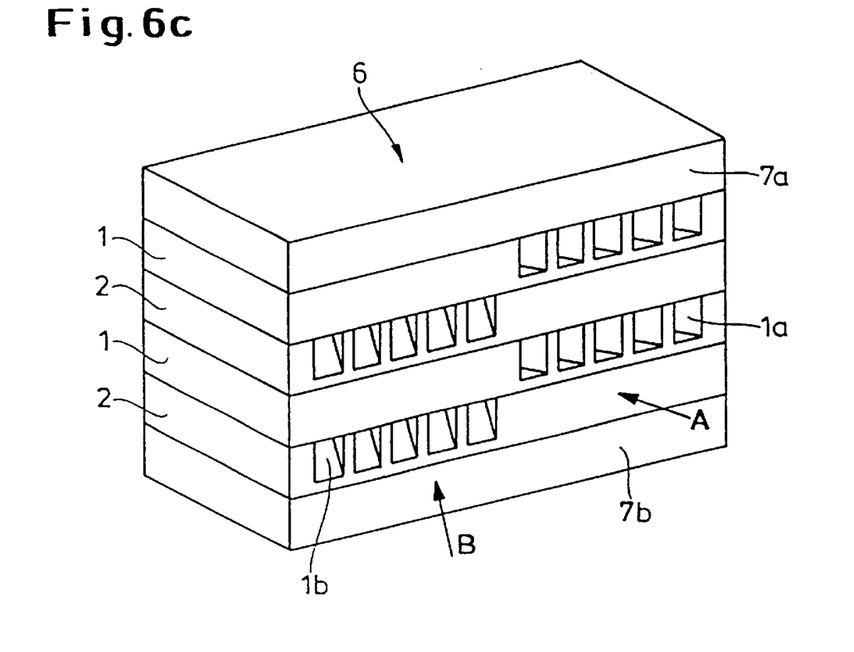
Figure 6D:
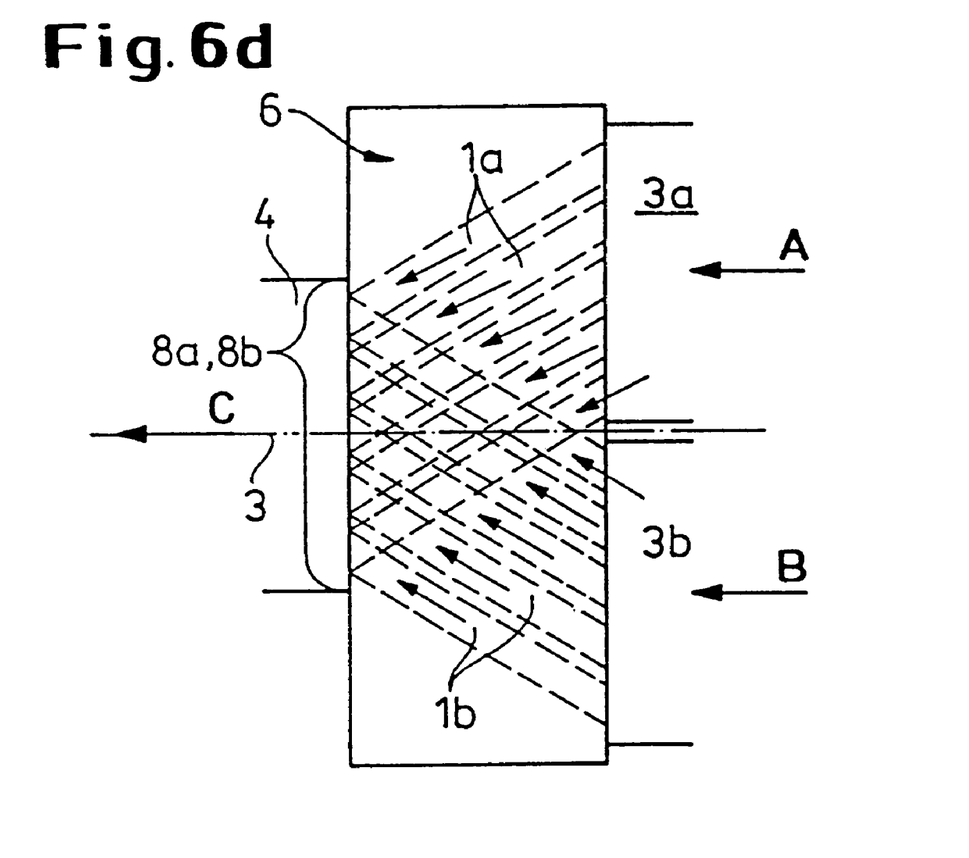
FIG. 6d is a diagrammatic representation of flow conditions prevailing in a microchannel disperser.

These arrays 8a, 8b form a common, for example square, cross-section having a density of approx. five thousand openings per cm$^2$, which are adjacent to the common dispersion/reaction chamber 4. FIG. 6c shows the guide component 6 from the feed side for fluids A and B. As may be seen from this figure and the top view according to FIG. 6d, the channels 1a, 1b running obliquely relative to the longitudinal axis 3 diverge alternately outwards from the dispersion/reaction chamber 4 towards the fluid inlet side such that fluids A and B may be fed separately into the guide component 6 each via an inlet chamber or distribution chamber 3a and 3b. After discharge from the guide component 6, the fine stream filaments of fluids A and B are brought into contact, initiating the dispersion process.

EXAMPLE 1

Dispersion by Atomisation

Paraffin oil (dynamic viscosity 15 mPa·s) was atomised at 20° C. in water using the microstructure dispersion apparatus shown in FIG. 1 and FIGS. 6a–6d. The objective was to produce the finest possible oil droplets while simultaneously achieving a narrow droplet size distribution.

The microstructure dispersion apparatus used is made from 100 superposed stainless steel foils (foil thickness 100 μm), wherein 50 foils each are associated with the oil phase and the water phase. 54 microchannels having a rectangular geometry (width×height=100 μm×70 μm) were machined on each foil using a diamond tool shaped by grinding. The microchannels are 14 mm in length. 2700 microchannels are thus available both for the disperse oil phase and for the continuous water phase. The throughput of paraffin oil through the microstructure dispersion apparatus is 8 l/h, that of water 20 l/h. The resultant flow velocity in the microchannels and at the channel outlet is 0.12 m/s for the oil phase (Reynolds number=0.7) and 0.29 m/s for the water phase (Reynolds number=24). Dispersion with such a microstructure dispersion apparatus gives rise to an exceptionally narrow droplet size range with an average droplet diameter of 238 μm with a standard deviation of 45 μm. Comparative tests with prior art dispersion apparatus (stirred tanks, nozzles, perforated plates) show that such narrow droplet size ranges cannot be established with such apparatus.

Typical fields of application which may be mentioned by way of example are bead polymerisation reactions, such as, for example, the production of uniformly spherical ion exchange resins.

EXAMPLE 2

Dispersion by Gas-bubbling of Liquids

Water containing 0.22 wt. % of isopropanol to inhibit coalescence was bubbled with nitrogen in a bubble column reactor (reactor height 2 m, reactor diameter 150 mm).

The microstructure dispersion apparatus more precisely defined in Example 1 was installed at the bottom of the bubble column reactor. At a throughput through the microstructure dispersion apparatus of 100 l/h for water and 2 Nm$^3$/h for nitrogen, i.e. at a superficial gas velocity of 3.1 cm/s relative to the empty reactor cross-section, fine gas bubbles of a diameter of approx. 500 μm are obtained with a narrow bubble size distribution simultaneously being achieved. This results in a correspondingly narrow residence time range of the rising gas bubbles in the bubble column reactor together with a large interfacial area per unit volume between the gas and liquid phase. Comparative tests using conventional gas bubbling devices (injector, diffuser) at the same superficial gas velocity of 3.1 cm/s give rise to distinctly broader bubble size distributions. The gas content achievable under these conditions in the bubble column reactor is 35% when the microstructure dispersion apparatus is used, 20% for the injector and only 11% for the diffuser. At a power input of 0.5 kW/m$^3$, a maximum interfacial area per unit volume of 35 cm$^2$/cm$^3$ is achieved for the microstructure dispersion apparatus, in comparison with only 13 cm$^2$/cm$^3$ for the injector.

Examples of fields of application for the microstructure dispersion apparatus which may be mentioned are any gas/liquid reactions, preferably rapid reactions, in which the overall reaction rate is determined by mass transfer, together with reactions in which the intention is to achieve the greatest possible depletion of the reaction component from the gas phase.

Bibliography

[1] Decker, W. -D., "Reaktionstechnik in Blasensäulen", Verlag Sauerländer, 1985
[2] Klinksiek, B., Koglin, B., "Verfahren zur Herstellung von Salben und Emulsionen", GVC/VDI proceedings, annual conference 1991, Cologne
[3] Gerstenberg, H., "Blasensäulen-Reaktoren", Chem.-Ing.-Tech. 51 (1979) 208
[4] Blaβ, E., "Bildung und Koaleszenz von Blasen und Tropfen", Dechema monographs, volume 114, VCH Verlagsgesellschaft

What is claimed is:

1. A process for the continuous dispersion of at least one fluid A constituting the disperse phase and at least one continuous phase constituting the enclosing phase of a fluid B, in which at least one fluid stream A and at least one fluid stream B are fed into a dispersion apparatus and come into contact therein in a dispersion chamber (4), wherein the fluid streams A, B are broken up into spatially separate, flowing fluid filaments in a microstructure dispersion apparatus (1a, 1b, 3a, 3b) by a system of microchannels (1a, 1b) associated therewith, which filaments are discharged into the dispersion chamber (4) at identical flow velocities for the particular fluid in such a manner that on discharge into the dispersion chamber a fluid jet (6a) of the disperse phase is in each case immediately adjacent to a fluid jet (6b) of the continuous phase and in each case a fluid jet (6a) of the disperse phase is enclosed as it is broken up into particles in the adjacent fluid jets (6b) of the continuous phase.

2. A process according to claim 1, wherein a gas is used as fluid A and a liquid as fluid B.

3. A process according to claim 1, wherein at least two different, emulsifiable liquids are used as the fluids.

4. A process according to claim 2, wherein educts A, B which react together chemically are used as the fluids, such that a chemical reaction of the educts A, B proceeds in the dispersion chamber simultaneously with the dispersion.

5. A process according to claim 1, wherein laminar flow conditions are maintained in the microchannels (1a, 1b) for the fluids A, B.

6. A process according to claim 1, wherein the fluid filaments of the fluids A, B are discharged into the dispersion chamber in alternately superposed or adjacent layers.

7. A process according to claim 1, wherein the fluid filaments of the fluids A, B are discharged into the dispersion chamber in a chess board arrangement.

8. A process according to claim 1,
wherein the diameter or thickness d of the fluid jets (6a, 6b) on entry into the dispersion chamber (4) is adjusted to a value between 10 μm and 1000 μm.

9. A process according to claim 8, wherein the cross-sectional ratio of the fluid jets (6a, 6b) of the continuous phase B and the disperse phase A is adjusted to values between 1 and 100.

10. A process according to claim 1, wherein a fluid jet of a temperature-controlled inert fluid is introduced into the dispersion chamber (4) in the vicinity of a fluid jet (6a, 6b).

* * * * *

UNITED STATES PATENT AND TRADEMARK OFFICE
CERTIFICATE OF CORRECTION

PATENT NO.    : 6,321,998 B1
DATED         : November 27, 2001
INVENTOR(S)   : Klaus Schubert et al.

It is certified that error appears in the above-identified patent and that said Letters Patent is hereby corrected as shown below:

<u>Title page,</u>
Item [56], U.S. PATENT DOCUMENTS, insert the following:

| | | | | |
|---|---|---|---|---|
| -- 1,639,179 | 8/16/27 | Hamel | 239 | 429 |
| 4,116,383 | 9/26/78 | Johnson | 230 | 8 |
| 4,328,107 | 5/04/82 | Wright | 239 | 433 |
| 4,473,185 | 9/25/84 | Peterson et al. | 239 | 8 |
| RE.33,531 | 2/05/91 | Demyanovich | 239 | 1 |
| 5,228,620 | 7/20/93 | Anderson et al. | 239 | 8 |
| 5,513,798 | 5/07/96 | Tavor | 239 | 8 |
| 5,645,223 | 7/08/97 | Hull et. al. | 239 | 433 |
| 5,845,846 | 12/08/98 | Watanabe et al. | 239 | 8 -- |

OTHER PUBLICATIONS, after "Blasensaulen." insert:
-- Decker, W.,- D., Verlag Sauerlander, 1985, pages 12-25, 320-329 --

Signed and Sealed this

Twenty-ninth Day of April, 2003

JAMES E. ROGAN
*Director of the United States Patent and Trademark Office*